Oct. 10, 1939.    M. C. HJELTE    2,175,170
FRUIT CUTTING DEVICE
Filed Sept. 7, 1938
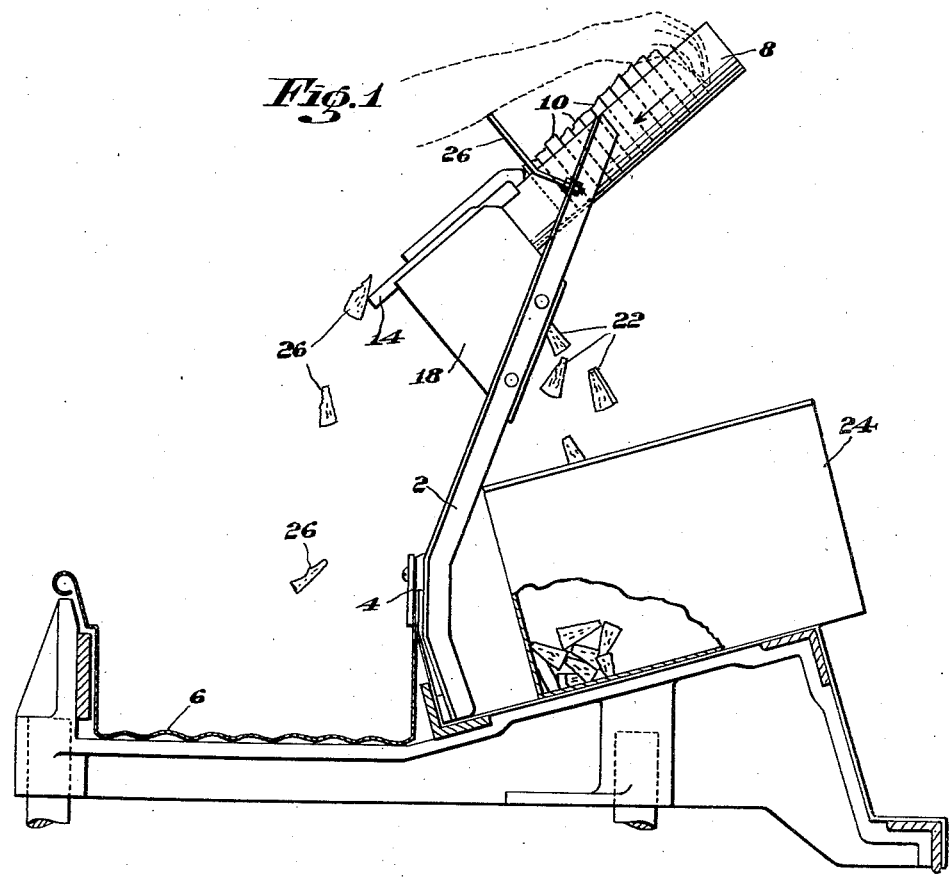
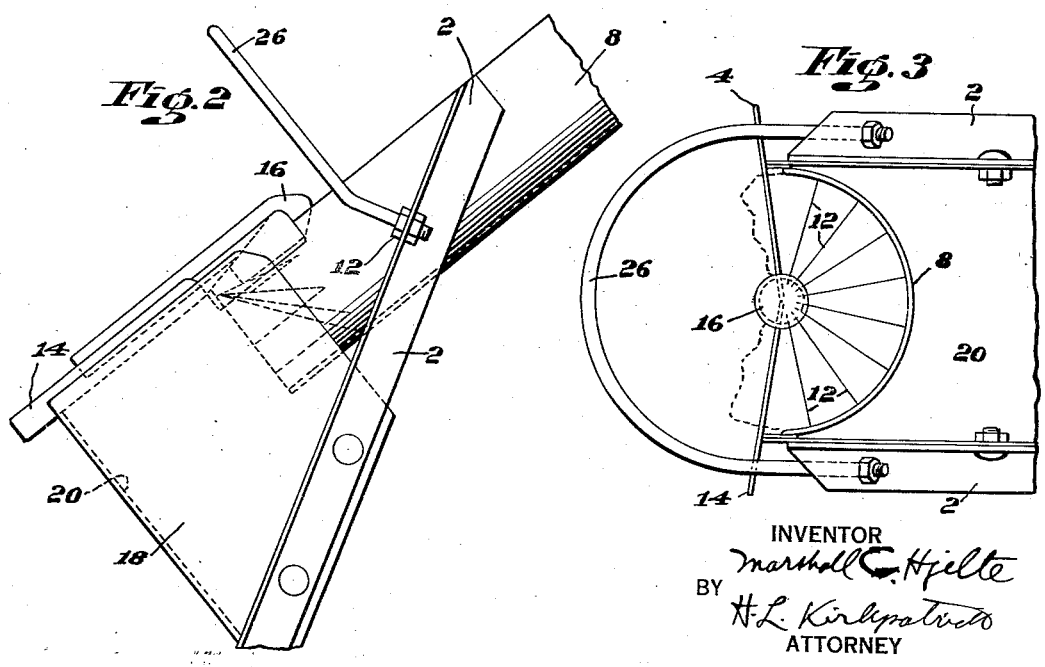
INVENTOR
Marshall C. Hjelte
BY
H. L. Kirkpatrick
ATTORNEY

UNITED STATES PATENT OFFICE 2,175,170

FRUIT CUTTING DEVICE

Marshall C. Hjelte, Honolulu, Territory of Hawaii, assignor to Hawaiian Pineapple Company, Limited, Honolulu, Territory of Hawaii, a corporation of the Territory of Hawaii Application September 7, 1938, Serial No. 228,727

6 Claims. (Cl. 146—6)

This invention relates to a machine for cutting broken slices of pineapple so that there are cut and separated from such slices a certain number of uniform or perfect segments which are directed into a convenient conveyer while simultaneously the imperfect or non-accepted pieces cut from the broken slices are separated and discharged on to the packing table for delivery, for example, to an apparatus for converting the same into crushed fruit.

Heretofore various machines have been devised for the treatment of damaged or imperfect slices but none of them were designed or suitable for the purpose served by the present invention, nor did they possess the advantages of the present invention as will hereinafter more fully appear. Specifically, the present invention provides a simple apparatus having no moving parts and whereby the operator, by a single hand motion and without locking or unlocking any part of the machine, loads the device and with one motion of his hand simultaneously cuts the fruit into a given number of perfect segments, discharges the imperfect or nonaccepting remaining portions, and by so doing also clears the machine to make it ready for the next loading of broken slices.

The invention is illustrated in the accompanying drawing, in which—

Fig. 1 is a side elevation;

Fig. 2 is an enlarged side elevation better illustrating the fixed knives and the mounting thereof together with the immediately adjacent portions of the machine; and Fig. 3 is a fragmentary elevation looking in the direction of the arrow in Fig. 1.

Referring to the drawing showing the preferred structure and in which like numerals represent like parts, the entire cutter assembly is mounted on a frame 2 provided with a clamp 4 to permit ready attachment to the cannery packing table 6 of usual construction. Affixed at the upper end of the frame 2 is a semi-circular chute 8 formed to receive the broken or imperfect slices of fruit 10 which are placed in the trough with the broken portions thereof uppermost. At the lower end of the trough 8 are affixed a series of intermediate knives 12 terminating in points as shown, and also two upper fixed knives 14 which are extended to form a deck so as to separate the upper broken or imperfect portions of fruit from the perfect segments formed by the upper knives in conjunction with the intermediate knives 12. The ends of the knives 12 terminate at a center guide 16 which has a conical end portion adapted to hold the inner ends of the knives 12 and 14, the outer ends of which knives are affixed to the semi-circular trough 8. Beyond the knives 12, which terminate at the lower end of the trough 8, are side guards 18 at the end of which is a connecting partition plate 20 which serves to direct downwardly the accepted perfect segments 22 passing beneath the knives 14, as shown in Fig. 1, so that such accepted segments 22 drop into and are held by a suitable removable container 24. As also shown in Fig. 1, the imperfect or nonaccepted portions 26 continue along over the upper knives 14 and are discharged beyond the ends thereof and fall on to the packing table 6. To protect the operator from the knives 12 and 14 there is affixed to the frame 2 at each side thereof a guard 26 which prevents the operator's hand or arm from accidentally pulling the slices so far down the chute as to permit him to contact the knives 12 and 14, as illustrated in Fig. 1. To operate the device, as will be obvious from Fig. 1, upon loading the broken slices into the trough 8 with the damaged portions uppermost, it is only necessary for the operator to give the assembled slices a single pull and then continue with a further loading and another pull, etc., without giving any attention or thought to the device. In this way any especial attention is obviated and no locking or unlocking in order to properly load and discharge the device as required. The simplicity of the device and its lack of any moving parts result in a very substantial saving in construction and in use, both of which are secured because of applicant's new organization which experience has proved to be a very practical piece of apparatus in the pineapple packing industry.

Having described the invention, what is claimed is:

1. A machine for cutting from broken slices of pineapple uniform segmental portions having, in combination, a supporting frame, an open-topped open-ended trough affixed to said frame adapted to hold in face-to-face relation an exposed series of slices to be cut, a series of radially arranged knives so affixed at an open end of said trough as to cut into segments slices of pineapple manually thrust thereagainst along said trough, and means at the exit side of said knives to separate uniformly cut segmental portions from any non-uniform portions of pineapple overlying the uppermost of said knives, whereby simply manually thrusting broken slices against said knives cuts uniform segments therefrom and separately discharges said uniform segments and non-uniform portions from the machine.

2. A machine for cutting from broken slices of pineapple uniform segmental portions having, in combination, a supporting frame, an open-topped open-ended trough affixed to said frame adapted to hold in face-to-face relation an exposed series of slices to be cut, a central guide member, a series of radially arranged knives so affixed at an open end of said trough as to cut into segments slices of pineapple manually thrust thereagainst along said trough, a hand guard in advance of said knives, and means at the exit side of said knives to separate the uniformly cut segmental portions from any non-uniform portions of pineapple overlying the uppermost of said knives, whereby simply manually thrusting broken slices against said knives cuts uniform segments therefrom and separately discharges said uniform segments and non-uniform portions from the machine.

3. A machine for cutting from broken slices of pineapple uniform segmental portions having, in combination, a supporting frame, an open-topped open-ended inclined trough affixed to said frame adapted to hold in face-to-face relation an exposed series of slices to be cut, a central guide member, a series of radially arranged knives so affixed at an open end of said trough as to cut into segments slices of pineapple manually thrust thereagainst along said trough, means to direct downwardly from the exit side of said knives uniformly cut segmental portions, and means to separate from said segmental portions any non-uniform portions of pineapple overlying said knives, whereby simply manually thrusting broken slices against said knives cuts uniform segments therefrom and separately discharges said uniform segments and non-uniform portions from the machine.

4. A machine for cutting from broken slices of pineapple uniform segmental portions having, in combination, a supporting frame, an open-topped open-ended inclined trough affixed to said frame adapted to hold in face-to-face relation an exposed series of slices to be cut, a central guide member, a series of radially arranged knives so affixed at the end of said trough as to cut into segments slices of pineapple manually thrust thereagainst along said trough, a hand guard over the trough in advance of said knives, means to direct downwardly from the exit side of said knives uniformly cut segmental portions, and means to separate from said segmental portions any non-uniform portions of pineapple overlying said knives, whereby simply manually thrusting broken slices against said knives cuts uniform segments therefrom and separately discharges said uniform segments and non-uniform portions from the machine.

5. A machine for cutting from broken slices of pineapple uniform segmental portions having, in combination, a supporting frame, an open-topped open-ended inclined trough affixed to said frame adapted to hold in face-to-face relation an exposed series of slices to be cut, a central guide member, a series of radially arranged knives so affixed at the lower open end of said trough as to cut into segments slices of pineapple manually thrust thereagainst along said trough, means to direct downwardly from the exit side of said knives uniformly cut segmental portions, the uppermost knives being extended to separate from said segmental portions any non-uniform portions of pineapple overlying said knives, whereby simply manually thrusting broken slices against said knives cuts uniform segments therefrom and separately discharges said uniform segments and non-uniform portions from the machine.

6. A machine for cutting from broken slices of pineapple uniform segmental portions having, in combination, a cannery packing table, a supporting frame, a clamp for said frame for attachment to said table, an open-topped open-ended inclined trough affixed to said frame adapted to hold in face-to-face relation an exposed series of slices to be cut, a central guide member, a series of radially arranged knives so affixed at the lower open end of said trough as to cut into segments slices of pineapple manually thrust thereagainst along said trough, a hand guard over said trough in advance of and adjacent to said knives, means to direct downwardly from the exit side of said knives and into a container uniformly cut segmental portions thrust through said knives, the uppermost knives being extended to separate from said segmental portions any non-uniform portions of pineapple overlying said knives and to direct the same onto said table.

MARSHALL C. HJELTE.